(No Model.)
E. L. CARAWAY.
CORN PLANTER.
No. 503,944. Patented Aug. 29, 1893.
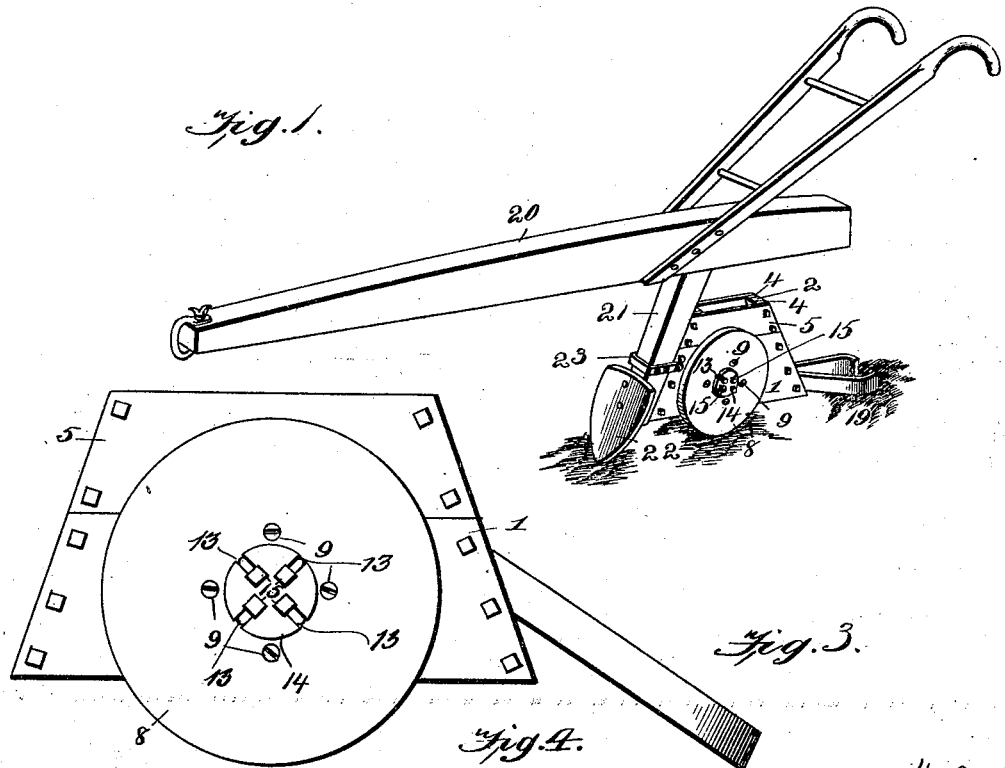
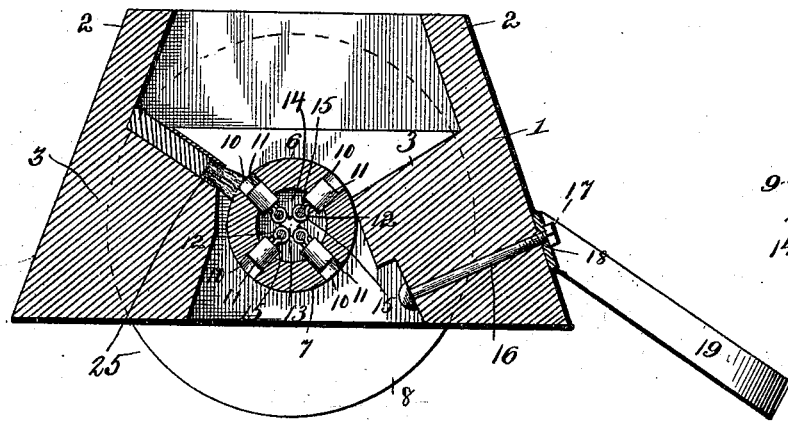
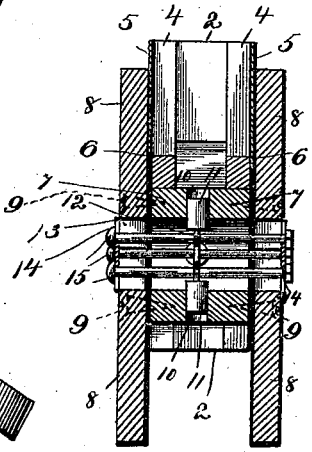
Witnesses
John C. Shaw
W. S. Duvall
Inventor
Emmet L. Caraway
By his Attorneys,
C. A. Snow & Co.

UNITED STATES PATENT OFFICE.

EMMET L. CARAWAY, OF RECTOR, ARKANSAS.

CORN-PLANTER.

SPECIFICATION forming part of Letters Patent No. 503,944, dated August 29, 1893.

Application filed March 7, 1893. Serial No. 464,940. (No model.)

*To all whom it may concern:*

Be it known that I, EMMET L. CARAWAY, a citizen of the United States, residing at Rector, in the county of Clay and State of Arkansas, have invented a new and useful Corn-Planter, of which the following is a specification.

My invention relates to corn-planters; and the objects in view are to produce a cheap and simple device adapted to plant not only corn, but cotton, broom-corn seed, sorghum, beans, peas, &c.; to adapt the same to be attached to the standard or foot of a plow, such as a bull-tongue or other construction, whereby the seed may be dropped into the furrow formed by the plow and subsequently covered; and to provide means for readily effecting the changes necessary to adapt the machine for planting the various seeds.

Other objects and advantages of the invention will appear in the following description and the novel features thereof will be particularly pointed out in the claims.

Referring to the drawings:—Figure 1 is a perspective view of a plow, a planter constructed in accordance with my invention being attached thereto. Fig. 2 is a longitudinal sectional view of the planter. Fig. 3 is a transverse vertical sectional view. Fig. 4 is a side elevation of the planter.

Like numerals of reference indicate like parts in all the figures of the drawings.

In practicing my invention I construct opposite vertical sides 1, whose lower edges are plain and parallel and whose ends decline preferably from top to bottom. These sides 1 have interposed between their end-edges end-filling-blocks 2, which decline in conformity with the end-edges of the sides 1 and are bolted thereto as shown. The filling-blocks 2 are provided at their lower halves and upon their inner surfaces with inwardly-projecting portions 3, whose upper edges are inclined and thus constitute the bottom of the hopper formed by the combined sides 1 and filling-blocks. The filling-blocks 2 have their upper reduced halves projecting above the upper edges of the sides 1, and upon said sides at the ends thereof posts 4, inclined to accord with the outer edges of the filling-blocks, are secured. Sheet-metal sides 5, complete the side-walls, said sheet-metal sides 5, posts 4, and blocks 2, being all bolted together. In this manner I produce a hopper which has considerable capacity when considered in connection with the fact that it is of no greater width than the plow-standard which it follows. The sides 1 between the lower projecting halves of the filling-blocks 2 are provided with circular openings 6, arranged in transverse alignment, and in these circular openings there is mounted the seed-cylinder 7. The seed-cylinder is adapted to revolve in the openings 6, and has its ends projecting very slightly beyond the surfaces of the sides 1, where ground-wheels 8, are located and secured rigidly to the cylinder by means of screws 9, passing through the ground-wheels and into the ends of the cylinder, so that as will be obvious, the ground-wheels and cylinder rotate in unison. The cylinder is provided with an axial bore, and is further provided with a series of radial circular openings or cups 10, which communicate with said bore. In each of the cups 10 a cylindrical plug 11, is adjustably located, the inner ends of the plugs extending into the bore 9 of the cylinder and there provided with eyes 12, which eyes are axially disposed, that is with their open sides toward the end of the cylinder. In transverse alignment with each eye thus described there is formed in the two wheels eight pairs of short radial slots 13, and upon the exterior of the wheels metal-plates 14 are, in this instance, employed, which metal-plates are slotted in conformity with the slots of the wheels. Through these transversely opposite pairs of slots transverse bolts 15 are passed, said bolts also passing through the eyes in the plugs. The heads of the bolts rest upon the slotted-plates of one wheel and the nuts at the opposite ends of the bolts rest upon the slotted-plate of the opposite wheel. Thus it will be seen that if the wheels are made of wood the heads and nuts of the bolts will not wear the same. If desired, however, the wheels may be made of metal, as may the entire device, in which case of course the wear-plates would not be used.

From the rear declining end of the hopper extends a threaded stud 16, the same having a nut 17, and said stud passes through an opening 18 formed in the center of a sheet-metal blank whose terminals are rearwardly disposed and bent to form covering-blades 19, the nut serving to bind the device in position.

20 designates a plow-stock or beam, 21 the foot or standard, and 22 the plow-share or shovel.

Any suitable device may be employed for securing the machine to the plow-foot or standard, but I have herein shown one simple means which is simply a clamp 23, though I do not limit the invention to this means of fastening. Nor do I limit the invention to the exact details herein shown, but hold that I may vary the same to any extent and degree within the skill of persons conversant with this class of machinery or the general skilled mechanic.

The operation of the device may be briefly stated as follows: The planter is adjusted upon the foot or standard so as to permit the shovel to enter a proper depth and form a furrow of suitable depth. The corn or other grain to be planted is placed in the hopper and the operation is carried on precisely the same as in plowing. The wheels 8 revolving over the ground by reason of their contact with the same rotate the cylinder 7 in its bearings and each cup in the cylinder receives a certain quantity of the seed, and after passing under the brush cut-off 25, which is in this instance located upon one of the inclined upper edges of the projection 3 of a filling-block, is dropped into the bottom of the furrow, and the covering-blades following immediately thereafter serve to return the loose displaced soil to the furrow thus covering the grain and forming the ridge in which the grain is drilled at regular and uniform intervals. It will be obvious that by loosening the nuts upon the bolts which pass through the eyes at the inner ends of the plugs the said bolts may be moved to any part of their respective slots and thus the plug controlled by the bolt drawn in or forced out of its opening or cup whereby the capacity of the latter is either increased or diminished and hence adapted for planting different kinds of seed.

From the foregoing description in connection with the accompanying drawings it will be seen that I have provided a machine of great simplicity, wholly obviating in the make up of the same the use of numerous attachments, gears, &c., which add to the complexity thereof, and that said machine is capable of being applied to any ordinary plow to follow thereafter without in any way increasing the draft of the plow, but to the contrary rather decreasing the same in that it supports and serves as a gage for the plow, said machine being adapted to deposit in uniform drills various kinds of grain and subsequently cover the same all in one continuous unbroken operation.

Having described my invention, what I claim is—

1. In a corn-planter, the combination with a hopper provided with bearing openings in the opposite walls of the hopper, of a cylinder having seed-cups journaled in the openings, means for attaching the hopper to a plow standard, and ground-wheels secured rigidly to the ends of the cylinder beyond the walls of the hopper, substantially as specified.

2. In a corn-planter, the combination with a hopper adapted to be secured to a plow-standard, said hopper having its opposite walls provided with circular openings, of a cylinder journaled in the openings and extending slightly beyond the same and provided with radial seed-cups, plugs mounted in the openings and terminating at their inner ends in eyes projecting into the cylinder, slotted wheels secured to the opposite ends of the cylinder, and transverse bolts mounted in the slots of the wheels and in the eyes of the plugs and provided with nuts, substantially as specified.

3. In a corn-planter, the combination with a hopper having opposite circular openings, a hollow cylinder having radial cups formed therein, said cylinder extending slightly beyond the side walls of the hopper, and ground-wheels rigidly secured to the ends of the cylinder and provided with radial slots, metal plates secured to the outer faces of the wheels and provided with corresponding slots, plugs mounted adjustably in the cups and having their inner ends within the cylinder provided with eyes, and transverse bolts provided with nuts passing through the slots in the wheels and the eyes of the plugs, the heads and nuts of the bolts bearing on the plates, substantially as specified.

4. In a corn-planter, the combination with a hopper having opposite bearing-openings, a cylinder having cups formed therein and journaled in the openings and projecting slightly therebeyond, of ground-wheels rigidly secured to the ends of the cylinder, plugs mounted in the cups, and means for adjusting the plugs in said cups, substantially as specified.

5. The combination with the inclined plow-foot or standard, the hopper having front and rear inclined ends, the opposite circular openings, a clamping-device for securing the hopper to the standard, a seed-cylinder having cups journaled in the openings in the hopper, and ground-wheels secured to the ends of the cylinder, substantially as specified.

6. A hopper adapted to be secured to a plow-standard and consisting of the opposite side walls having annular openings and end posts, the intermediate filling-blocks having their lower halves inwardly projecting to form the bottom of the hopper, the sheet-metal sides secured to the posts, bolts passing through the sheet-metal sides and posts and filling blocks, the cylinder mounted in the openings, the wheels carried by the cylinder, the stud at the rear end of the hopper, the metal blank having a perforation to receive the stud and its terminals bent to form covering-blades, substantially as specified.

In testimony that I claim the foregoing as my own I have hereto affixed my signature in the presence of two witnesses.

EMMET L. CARAWAY.

Witnesses:
C. C. NEELY,
Z. T. BEARDEN.